April 24, 1951 B. CARLIN 2,550,528
SUPERSONIC INSPECTION
Filed June 7, 1947
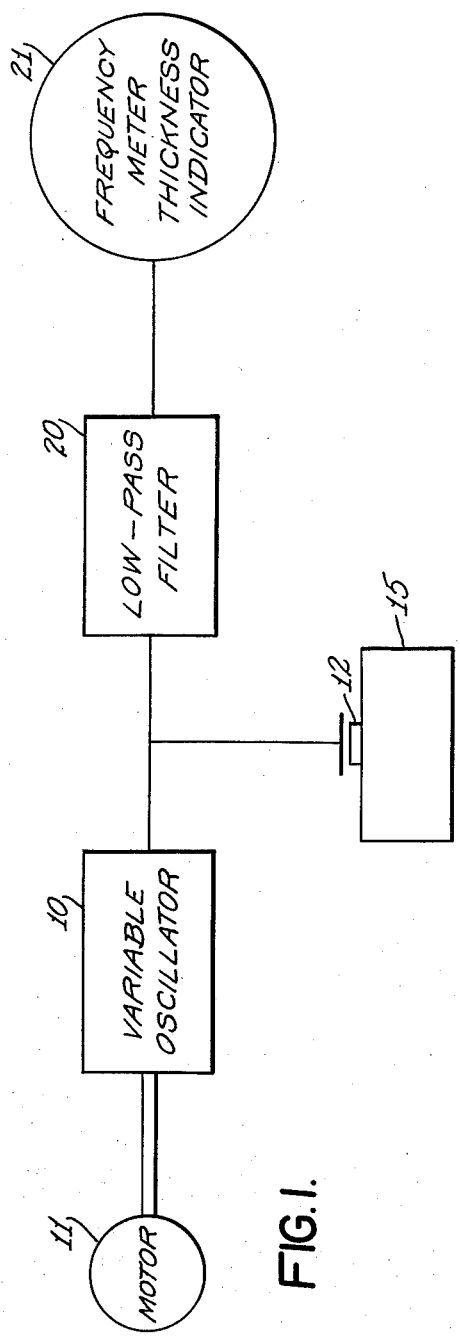
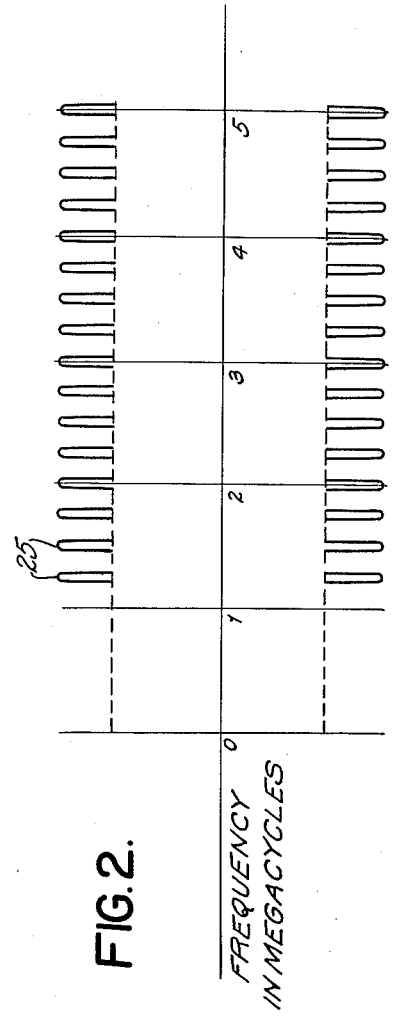
INVENTOR.
BENSON CARLIN
BY
Joseph H. Lipschutz
ATTORNEY Patented Apr. 24, 1951

2,550,528

UNITED STATES PATENT OFFICE 2,550,528

SUPERSONIC INSPECTION

Benson Carlin, New York, N. Y., assignor to Sperry Products, Inc., Hoboken, N. J., a corporation of New York Application June 7, 1947, Serial No. 753,327

2 Claims. (Cl. 73—67)

1

This invention relates to apparatus for supersonic inspection which is particularly adapted to the measurement of thickness of bodies. Such devices are specially useful where only one surface of an object whose thickness is to be measured is available. Various means have been proposed for measuring such thickness by supersonic methods and one of these consists in transmitting varying frequencies through the object and noting the frequencies at which resonance takes place. In one form of such device the resonant peaks are indicated on an oscilloscope and since peaks will occur at multiples of the basic frequencies of the object, the distance between adjacent resonant peaks is measured. This distance is a function of the thickness of the object and by referring to a suitable graph or table the thickness can be determined from this data.

From the above it will be noted that the method of determining the thickness of an object supersonically where only one surface is accessible requires several steps. Such a method is time-consuming and cannot be employed where quickness of indication is essential. It is therefore one of the principal objects of this invention to provide apparatus for thickness measurement in which the thickness may be indicated directly from the oscillations received from the object under test.

Further objects and advantages of this invention will become apparent from the following detailed description thereof.

In the accompanying drawings,

Fig. 1 is a block diagrammatic representation of the invention.

Fig. 2 is a modified oscillograph illustrating the principle of the invention.

As stated in the introduction hereto each thickness of material through which supersonic vibrations are being transmitted will resonate at a basic frequency and at multiples of the basic frequency. Thus for example a piece ½" thick may resonate at ¼ mc., ½ mc., ¾ mc., etc. The method heretofore employed was to vary the frequency until one resonant frequency was obtained and then a second resonant frequency, these frequencies being indicated on the sweep of an oscilloscope, and the distance between adjacent resonant peaks being then measured. This distance is a function of the thickness and by reference to a suitable chart or graph, the thickness can be determined. Instead of this method, I disclose herein a method whereby the thickness of the object under test may be indicated directly in response to the oscillations in the object.

To accomplish the above result, I employ a variable oscillator 10 whose output may be varied

2 periodically through a given range as for example 1 mc. to 5 mc. The frequency of the oscillator may be varied by means of a motor 11 designed to produce a predetermined number of sweeps of the oscillator from 1 mc. to 5 mc. per unit of time. Thus, for instance, the motor may drive the oscillator to sweep the frequency through its range 60 times per second. The output of the oscillator is applied to a piezo-electric crystal 12 in contact with the object 15 under test so that oscillations of a frequency ranging from 1 to 5 mc. are transmitted into the object the desired number of times per second (60 times, in the example cited). Through a range of 4 mc. there will be a definite number of resonant peaks, the number depending upon the thickness of the object. Thus, for example, if the piece is ½" thick and of suitable material there will be a basic resonance at ¼ mc. and at each ¼ mc. thereafter, so that as shown in Fig. 2 there will be 16 such resonant peaks, as indicated at 25, for each sweep of the oscillator. If the number of resonant peaks per sweep is multiplied by the number of sweeps per second there will be obtained a frequency of occurrence of resonant peaks which is a direct function of the thickness of the object. In the example assumed, the ½" block will give 16 times 60 or a frequency of occurrence of resonant peaks equal to 960. This frequency can be separated from the scanning frequencies transmitted into the object by the oscillator by means of a low pass filter 20 so that only the frequency of occurrence of resonant peaks will pass through the filter to actuate a frequency meter 21. Since the number of resonant peaks per sweep of the oscillator is a function of the thickness, the frequency indicated by the frequency meter will be a direct indication of the thickness of the object under test. The frequency meter may therefore be calibrated directly in terms of thickness.

The following table gives some examples of various thicknesses in a given material and the resulting frequencies of resonance:

| Wall Thickness | Resonates At— | Resonates Between 1 mc. and 5 mc. at— | Total Times Resonant For Each Sweep | Total Times of Resonance per Sec. (When sweep is 60/sec.) |
|---|---|---|---|---|
| Inches | Mc. | | | |
| ½ | ¼ | 1¼, 1½, 1¾, etc. | 16 | 960 |
| ⅜ | ⅓ | 1⅓, 1⅔, 2, etc. | 12 | 720 |
| ¼ | ½ | 1½, 2, 2½, etc. | 8 | 480 |
| ⅝ | ⅕ | 1⅕, 1⅖, 1⅗, etc. | 20 | 1,200 |

Having described my invention, what I claim and desire to secure by Letters Patent is:

1. In a device for measuring and directly indicating thickness of an object, means for generating a predetermined frequency range of supersonic electrical oscillations, electro-acoustic transducer means energized by said oscillations for transmitting vibrations into the object and for receiving the vibrations from the object, the object vibrating at peak resonance at its basic frequency and at multiples of the basic frequency during the sweep of the vibrations through the predetermined range, a filter for separating the frequency of supersonic oscillation from the frequency of the occurrence of peak resonance, and means responsive to the frequency of occurrence of the resonant peaks as a measure of thickness of the object.

2. In a device for measuring and directly indicating thickness of an object, means for periodically generating a predetermined frequency range of supersonic electrical oscillations, electro-acoustic transducer means energized by said oscillations for transmitting vibrations into the object and for receiving the vibrations from the object, the object vibrating at peak resonance at its basic frequency and at multiples of the basic frequency during each sweep of the vibrations through the predetermined range, a filter for separating the frequency of supersonic oscillation frequency from the frequency of the occurrence of peak resonance, and means for indicating the frequency of occurrence of the resonant peaks as a measure of thickness of the object.

BENSON CARLIN.

REFERENCES CITED

The following references are of record in the file of this patent:

UNITED STATES PATENTS

| Number | Name | Date |
|---|---|---|
| 1,991,060 | Osbon | Feb. 12, 1935 |
| 2,431,234 | Rassweiler et al. | Nov. 18, 1947 |

OTHER REFERENCES

Article by W. S. Erwin, "The Sonigage," S. A. E. Journal, vol. 53, No. 3, pp. 25–27. (A copy of this article is in Div. 36.)